United States Patent
Takata et al.

(10) Patent No.: US 11,815,649 B2
(45) Date of Patent: Nov. 14, 2023

(54) LIQUID OBJECT DETECTOR AND LIQUID OBJECT DETECTING METHOD

(71) Applicant: SHISEIDO COMPANY, LTD., Tokyo (JP)

(72) Inventors: Motoki Takata, Tokyo (JP); Motoji Aoki, Tokyo (JP); Yohei Kobayashi, Tokyo (JP); Yusuke Okamoto, Fukuoka (JP); Takenori Okamura, Fukuoka (JP); Kazunari Anai, Fukuoka (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 151 days.

(21) Appl. No.: 17/594,462

(22) PCT Filed: Apr. 26, 2019

(86) PCT No.: PCT/JP2019/018134
§ 371 (c)(1),
(2) Date: Oct. 18, 2021

(87) PCT Pub. No.: WO2020/217524
PCT Pub. Date: Oct. 29, 2020

(65) Prior Publication Data
US 2022/0214471 A1 Jul. 7, 2022

(51) Int. Cl.
*G01V 8/10* (2006.01)
*B05B 11/10* (2023.01)

(52) U.S. Cl.
CPC .............. *G01V 8/10* (2013.01); *B05B 11/10* (2023.01)

(58) Field of Classification Search
CPC .. G01V 8/10; G01V 8/20; G05B 11/10; G05B 12/004; G05B 12/12
See application file for complete search history.

(56) References Cited

U.S. PATENT DOCUMENTS

| | | |
|---|---|---|
| 5,589,858 A | 12/1996 | Kadowaki et al. |
| 2004/0135074 A1 | 7/2004 | Kamiyama et al. |
| 2006/0170733 A1 | 8/2006 | Lee et al. |
| 2016/0052007 A1* | 2/2016 | Fuller .................... A45D 34/00 222/638 |
| 2018/0335297 A1* | 11/2018 | Maclean .................. G01J 1/44 |

FOREIGN PATENT DOCUMENTS

| | | |
|---|---|---|
| EP | 2799830 | 11/2014 |
| JP | H04-027552 | 1/1992 |
| JP | H08-323271 | 12/1996 |
| JP | H10-193643 | 7/1998 |
| JP | 2004-170386 | 6/2004 |
| JP | 2006-213051 | 8/2006 |
| WO | 2016/029104 | 2/2016 |

OTHER PUBLICATIONS

Extended European Search Report issued in the counterpart European Patent Application No. 19926268.4, dated Oct. 31, 2022.
International Search Report for PCT/JP2019/018134 dated Jul. 9, 2019.

* cited by examiner

*Primary Examiner* — Kevin K Pyo
(74) *Attorney, Agent, or Firm* — IPUSA, PLLC

(57) ABSTRACT

A liquid object detector (160) includes a liquid object dispensing part (500), a sensor (161, 162, 163) configured to detect a liquid object dispensed by the liquid object dispensing part, and a sensor moving part (130, 165) configured to move the sensor in a direction crossing a dispensing direction of the liquid object.

4 Claims, 10 Drawing Sheets

LIQUID OBJECT DETECTOR AND LIQUID OBJECT DETECTING METHOD

TECHNICAL FIELD

The present invention relates to liquid object detectors and liquid object detecting methods.

BACKGROUND ART

A dispenser that automatically dispenses and supplies a cosmetic or the like stored in a storage tank has been known (Patent Document 1).

PRIOR ART DOCUMENT

Patent Document

Patent Document 1: International Publication No. 2016/029104

SUMMARY OF THE INVENTION

Problems to be Solved by the Invention

According to the conventional art, however, whether a liquid object has actually been dispensed from the storage tank in which the liquid object is stored is not detected and is unclear when the liquid object is dispensed from the dispenser.

An embodiment of the present invention has an object of providing a device and a method that can stably detect the dispensing of a liquid object in a liquid object dispenser.

Means for Solving the Problems

A liquid object detector according to the disclosure includes a liquid object dispensing part, a sensor configured to detect a liquid object dispensed by the liquid object dispensing part, and a sensor moving part configured to move the sensor in a direction crossing a dispensing direction of the liquid object.

Effects of the Invention

It is possible to stably detect the dispensing of a liquid object in a liquid object dispenser.

EMBODIMENT OF THE INVENTION

An embodiment of the present invention is described in detail below using the accompanying drawings.

<Liquid Object Dispensing System 1>

Figure 1:
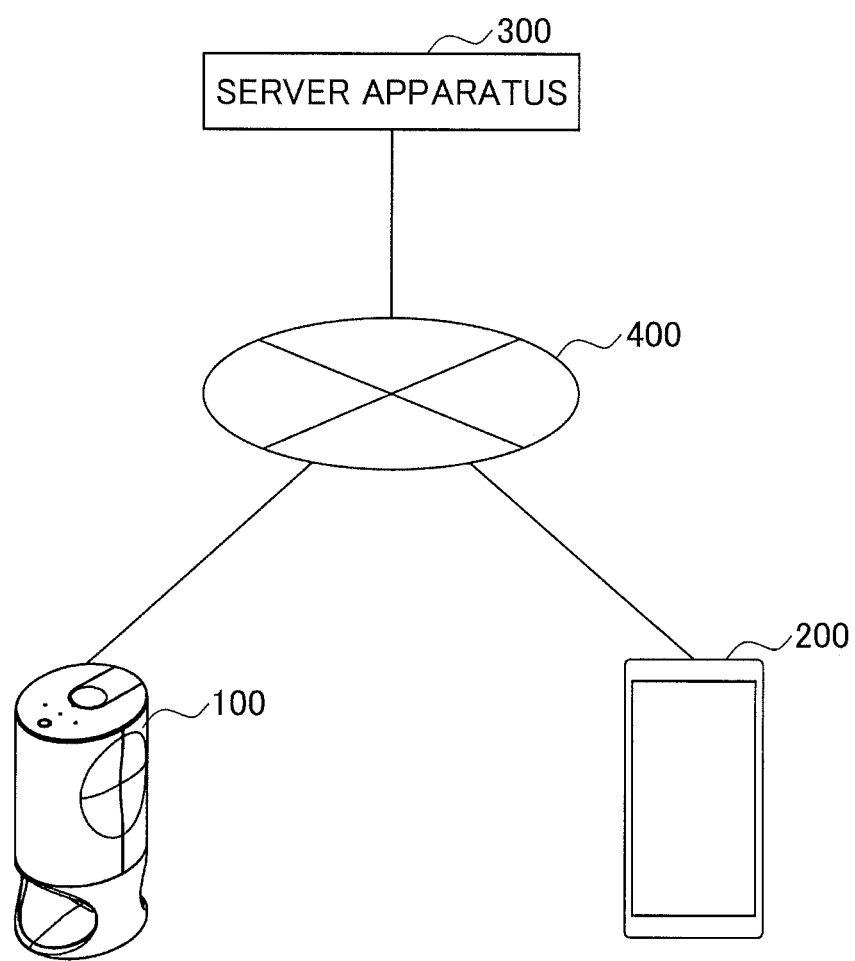
FIG. 1 is an overall configuration diagram of an example of a liquid object dispensing system according to this embodiment.

FIG. 1 is an overall configuration diagram of an example of a liquid object dispensing system 1 according to this embodiment.

The liquid object dispensing system 1 according to this embodiment includes a liquid object dispenser 100, an information processing terminal 200, and a server apparatus 300. The liquid object dispenser 100, the information processing terminal 200, and the server apparatus 300 are connected via a network 400. The liquid object dispenser 100 will be described later. The information processing terminal 200 is, for example, a portable terminal such as a smartphone or a tablet computer. The information processing terminal 200 transmits user information, etc., to the server apparatus 300. The server apparatus 300 is an information processor (computer) that executes processes as a server. The server apparatus 300 manages a user of the liquid object dispenser 100 and the state of the liquid object dispenser 100. Furthermore, the server apparatus 300 determines the manner in which the liquid object dispenser 100 is caused to operate, based on user information, etc., transmitted from the information processing terminal 200 and weather information, etc., open to the public.

According to the liquid object dispensing system 1 of this embodiment, the liquid object dispenser 100 receives information on the operation of the liquid object dispenser 100 (operation information) from the server apparatus 300 via the network 400. The liquid object dispenser 100 executes processes based on the received operation information. Furthermore, the liquid object dispenser 100 transmits the results of the processes executed based on the received operation information to the server apparatus 300. The server apparatus 300 updates information on the state of the liquid object dispenser 100, etc.

According to FIG. 1, the liquid object dispenser 100, the information processing terminal 200, and the server apparatus 300, one each, are connected to the network 400, but their respective numbers are not limited to those of FIG. 1. For example, multiple liquid object dispensers 100 and multiple information processing terminals 200 may be connected to the single server apparatus 300. Furthermore, the processes of the server apparatus 300 may be distributed between or among and executed by multiple server apparatuses 300. Moreover, the liquid object dispenser 100 may be caused to operate independently without being connected to the network 400.

<Liquid Object Dispenser 100>

Next, the liquid object dispenser 100 is described.

Figure 2:
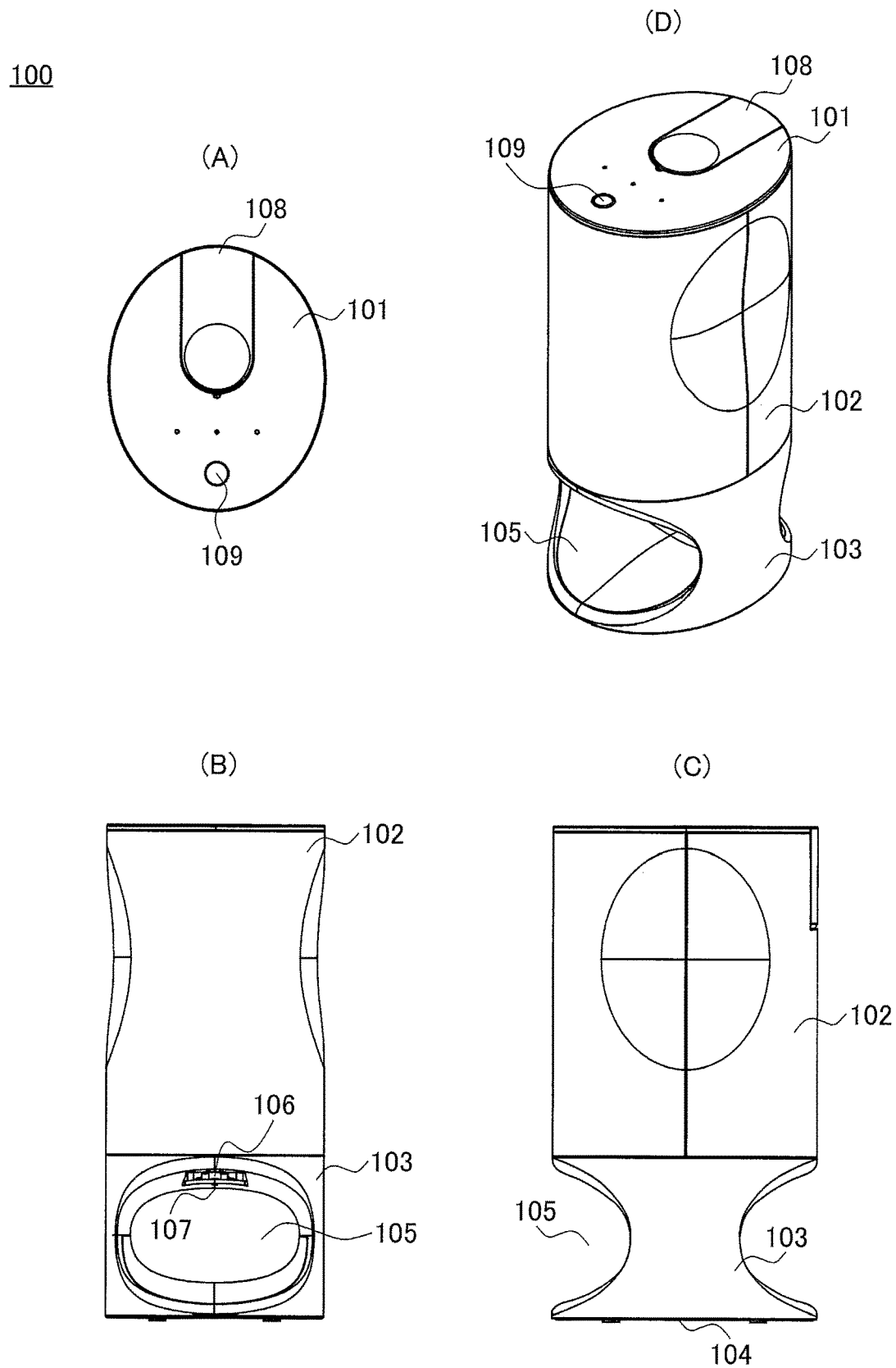
FIG. 2 is an overall view of an example of a liquid object dispenser according to this embodiment.

FIG. 2 is an overall view of an example of the liquid object dispenser 100 according to this embodiment. FIG. 2(A) is a top view (plan view) of the liquid object dispenser 100. FIG. 2(B) is a front view of the liquid object dispenser 100. FIG. 2(C) is a side view of the liquid object dispenser 100. FIG. 2(D) is a perspective view of the liquid object dispenser 100.

The liquid object dispenser 100 includes an upper surface part 101, an upper housing 102, a lower housing 103, and a bottom surface part 104. The liquid object dispenser 100 has a substantially cylindrical shape. The lower housing 103 includes a hand insertion part 105. Furthermore, the lower housing 103 includes an extraction opening 106 and a human body sensor 107 above the hand insertion part 105. A user inserts a hand into the hand insertion part 105, and the human body sensor 107 detects the hand. In response to detection of the hand by the human body sensor 107, a stored liquid (liquid object) stored in a below-described container 500 is dispensed from the extraction opening 106. The liquid object dispenser 100 includes a container lid 108. The container lid 108 is provided over the upper surface part 101 and the upper housing 102. The user opens the container lid 108 to replace the below-described container 500 that is exposed through an opening exposed by the opened container lid 108. Furthermore, the liquid object dispenser 100 includes a button (switch) 109 in the upper surface part 101. Once the user presses the button 109, the liquid object dispenser 100 starts to operate.

<Container 500>

Next, the container 500 is described.

Figure 3:
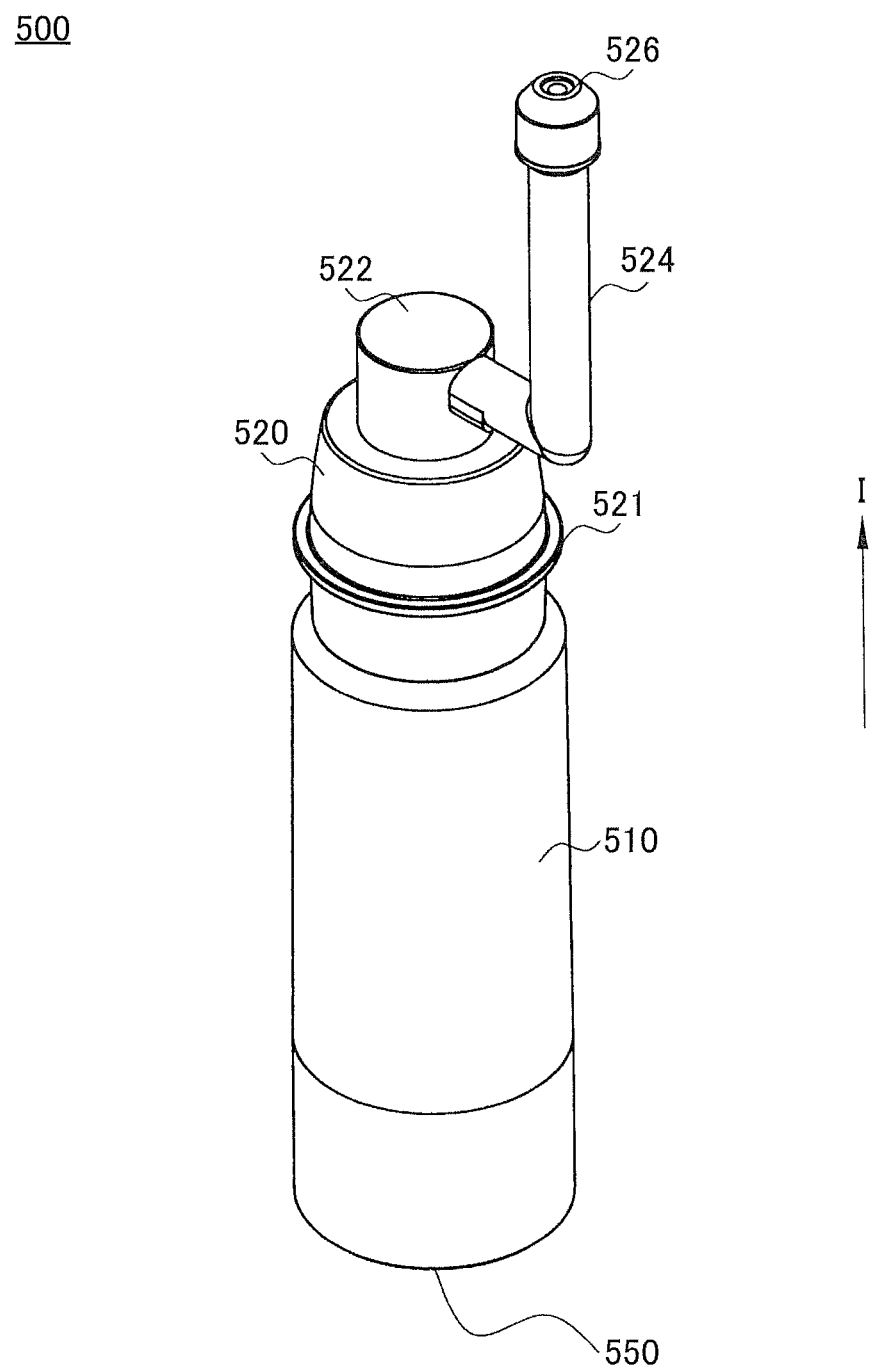
FIG. 3 is a perspective view of a container of an example of the liquid object dispenser according to this embodiment.

FIG. 3 is a perspective view of the container 500 of an example of the liquid object dispenser 100 according to this embodiment.

The container 500 is, for example, a container that stores a liquid object (stored liquid) such as a cosmetic such as an emulsion or a serum. With respect to emulsions, for example, multiple types of emulsions may be used for morning and for night. With respect to serums, for example, multiple types of serums for anti-oxidation, drying prevention, stress reduction, etc., may be used.

The container 500 according to this embodiment includes a body 510 and a lid 520. A stored liquid (liquid object) is stored in the body 510. The lid 520 is attached to the body 510 by screwing or the like. The lid 520 includes a flange 521, a push button (pressing member) 522, and a pipe 524. A dispensing opening 526 from which the stored liquid (liquid object) is dispensed is provided at an end of the pipe 524 opposite to the push button 522. The liquid object (stored liquid) in the container 500 is dispensed in response to the pressing of the push button 522.

The body 510 of the container 500 is an example of a storage part. Furthermore, the container 500 operates as a push pump with the push button 522 of the lid 520.

The container 500 includes an RFID tag 550 at the bottom surface part of the body 510. The RFID tag 550 stores a unique identifier attached to each container 500, information on the product type of the liquid object (stored liquid) stored in the container 500, and the expiration date, the remaining amount, etc., of the liquid object. Because the container 500 includes the RFID tag 550, it is possible to manage the use-by date and the amount of use of the liquid object (stored liquid) stored in the container 500, prevent wrong insertion of the container 500, prevent distribution of counterfeit products, and ensure the traceability of the container 500 and the liquid object (stored liquid) stored in the container 500.

While the container 500 of this embodiment uses the RFID tag 550, means for recording information on the container 500 is not limited to RFID tags. For example, a barcode, etc., may also be used.

The container 500 of this embodiment is accommodated in a below-described container accommodating part 120 of a turntable 110 of the liquid object dispenser 100 in such a manner that the push button 522 faces downward. Specifically, the container 500 is inserted into the container accommodating part 120 in the direction of arrow I to be accommodated in the container accommodating part 120.

<Turntable 110>

Figure 4:
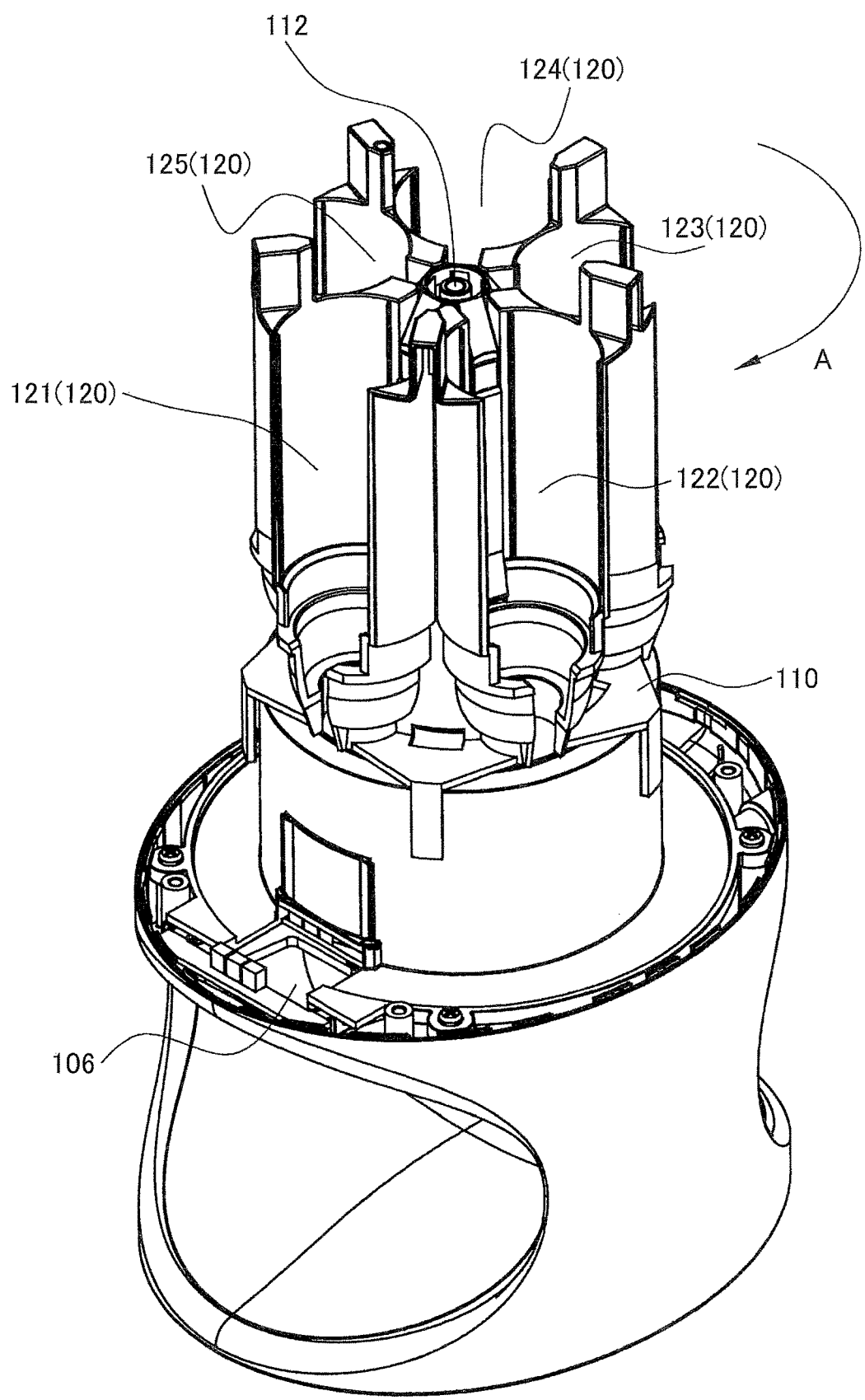
FIG. 4 is a perspective view of an example of the liquid object dispenser according to this embodiment, illustrating its internal structure.
Figure 5:
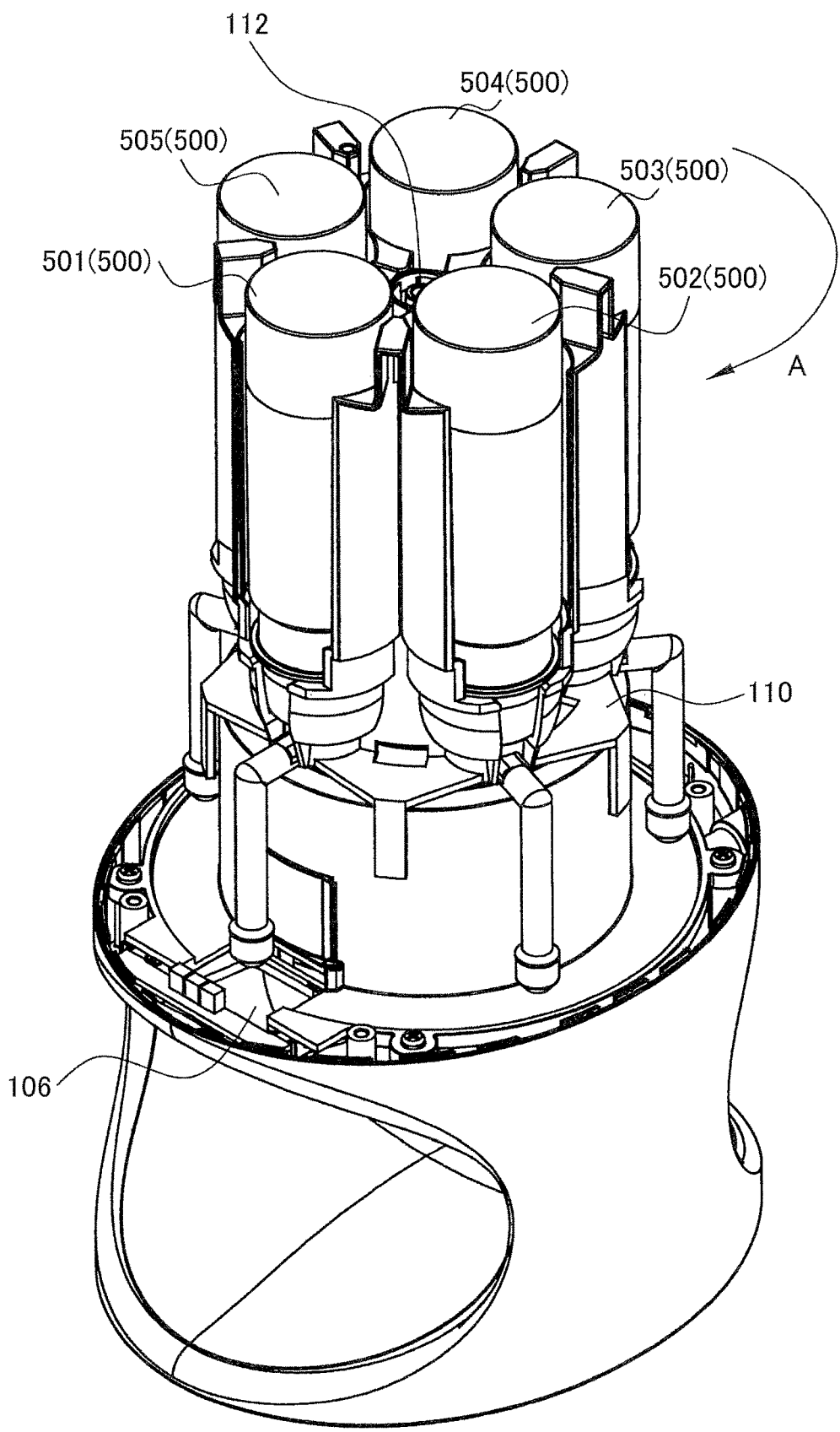
FIG. 5 is a perspective view of an example of the liquid object dispenser according to this embodiment, illustrating its internal structure.

FIGS. 4 and 5 are perspective views of an example of the liquid object dispenser 100 according to this embodiment, illustrating its internal structure. FIGS. 4 and 5 are diagrams illustrating a state where the upper housing 102 and part of the inside of the upper housing 102 are removed to expose the turntable 110. FIG. 4 is a diagram illustrating a state where the containers 500 are not accommodated in the container accommodating parts 120. FIG. 5 is a diagram illustrating a state where the containers 500 are accommodated in the container accommodating parts 120.

The liquid object dispenser 100 according to this embodiment includes the turntable 110 in the upper housing 102 and on top of the lower housing 103. The turntable 110 rotates on a rotary shaft 112 in the direction of arrow A or in a direction opposite to arrow A relative to the upper housing 102 and the lower housing 103. While the turntable 110 is used to rotationally transfer the containers 500 according to the liquid object dispenser 100 of this embodiment, the transfer method is not limited to rotation. For example, a transfer table that horizontally transfers the container accommodating parts 120 on a straight line may also be used. Thus, the turntable 110 is movable relative to the upper housing 102 and the lower housing 103. The turntable 110 is an example of a transfer table.

The turntable 110 includes the container accommodating parts 120 that accommodate the containers 500. The container accommodating parts 120 are disposed at regular intervals in the circumferential direction of a circle having a center at the rotary shaft 112. The turntable 110 of this embodiment includes the container accommodating parts 120 at five places in total. The container accommodating parts 120 are designated as container accommodating parts 121, 122, 123, 124 and 125. The container accommodating part 121 accommodates a container 501. Likewise, the container accommodating parts 122, 123, 124 and 125 accommodate containers 502, 503, 504 and 505, respectively. While each container accommodating part 120 accommodates a specific container 500 according to the above description, each container accommodating part 120 may accommodate any container 500. Furthermore, the containers 500 are accommodated in the container accommodating parts 120 in such a manner that the pipes 524 are on the outer side of the container accommodating parts 120 relative to the rotary shaft 112 of the turntable 110.

The container accommodating parts 120 of the turntable 110 include a fixation structure (whose graphical representation is omitted) that fixes the containers 500. The containers 500 are fixed by the fixation structure so as not to move in the vertically upward direction of FIG. 5 when accommodated in the container accommodating parts 120.

Each container 500 revolves relative to the upper housing 102 and the lower housing 103 as the turntable 110 rotates.

Figure 6:
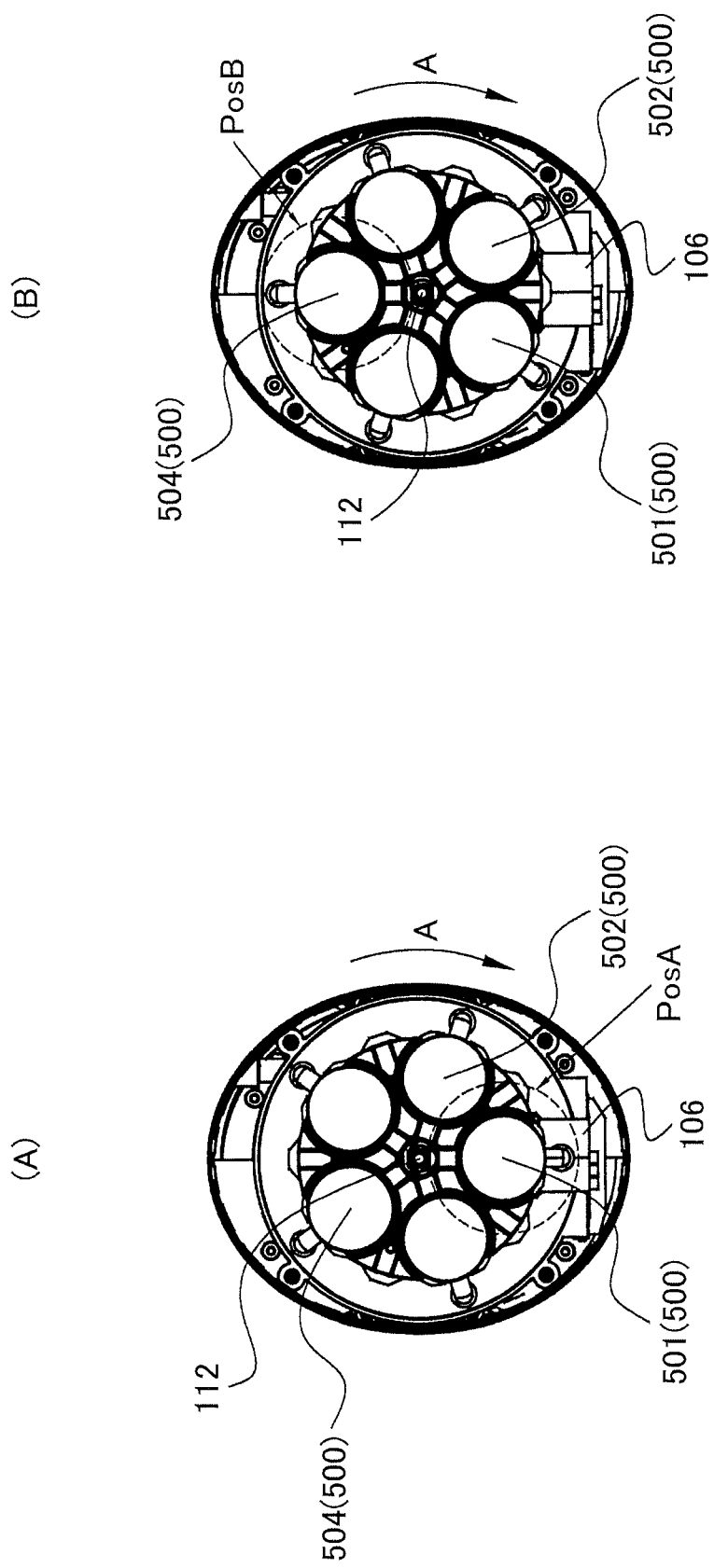
FIG. 6 illustrates top views of an example of the liquid object dispenser according to this embodiment, illustrating its internal structure.

FIG. 6 illustrates top views of an example of the liquid object dispenser 100 according to this embodiment, illustrating its internal structure. FIG. 6 illustrates views of the turntable 110 in which the containers 500 are accommodated in the container accommodating parts 120 as seen from above. FIG. 6(A) illustrates a state where the container 500 (the container 501) is positioned over the extraction opening 106. FIG. 6(A) is a view of the liquid object dispenser 100 of FIG. 5 as seen from above. The position of the container 501 over the extraction opening 106 is referred to as dispensing position PosA. According to the liquid object dispenser 100 of this embodiment, the five containers 500 in total may be accommodated in the container accommodating parts 120. Therefore, as the turntable 110 rotates 72° on the rotary shaft 112, the containers 501, 502, 503, 504 and 505 sequentially arrive at the dispensing position PosA.

FIG. 6(B) depicts a state where the turntable 110 has rotated 36 degrees in the direction of arrow A from the state illustrated in FIG. 6(A). FIG. 6(B) depicts a state where the middle part between the container 501 and the container 502 is positioned over the extraction opening 106. The position opposite to the dispensing position PosA relative to the rotary shaft 112 (the position of the container 504 in FIG. 6(B)) is referred to as replacement position PosB. In FIG. 6(B), as the turntable 110 illustrated in FIG. 6(A) rotates 36°, the container 504 (500) also rotates 36° to be positioned at PosB. When the container lid 108 is opened, the container 500 at the replacement position PosB is exposed to the outside. The user can replace the container 500 at the replacement position PosB with another container 500.

Thus, according to the liquid object dispenser 100 of this embodiment, the turntable 110 is configured to rotate 36° by 36° on the rotary shaft 112. As a result, the containers 501 through 505 can sequentially be positioned at the dispensing position PosA or the replacement position PosB.

According to the liquid object dispenser 100 of this embodiment, as illustrated in FIG. 6, the dispensing position PosA and the replacement position PosB are at different positions in a plan view (a top view).

<Dispensing Mechanism 130>

Figure 7:
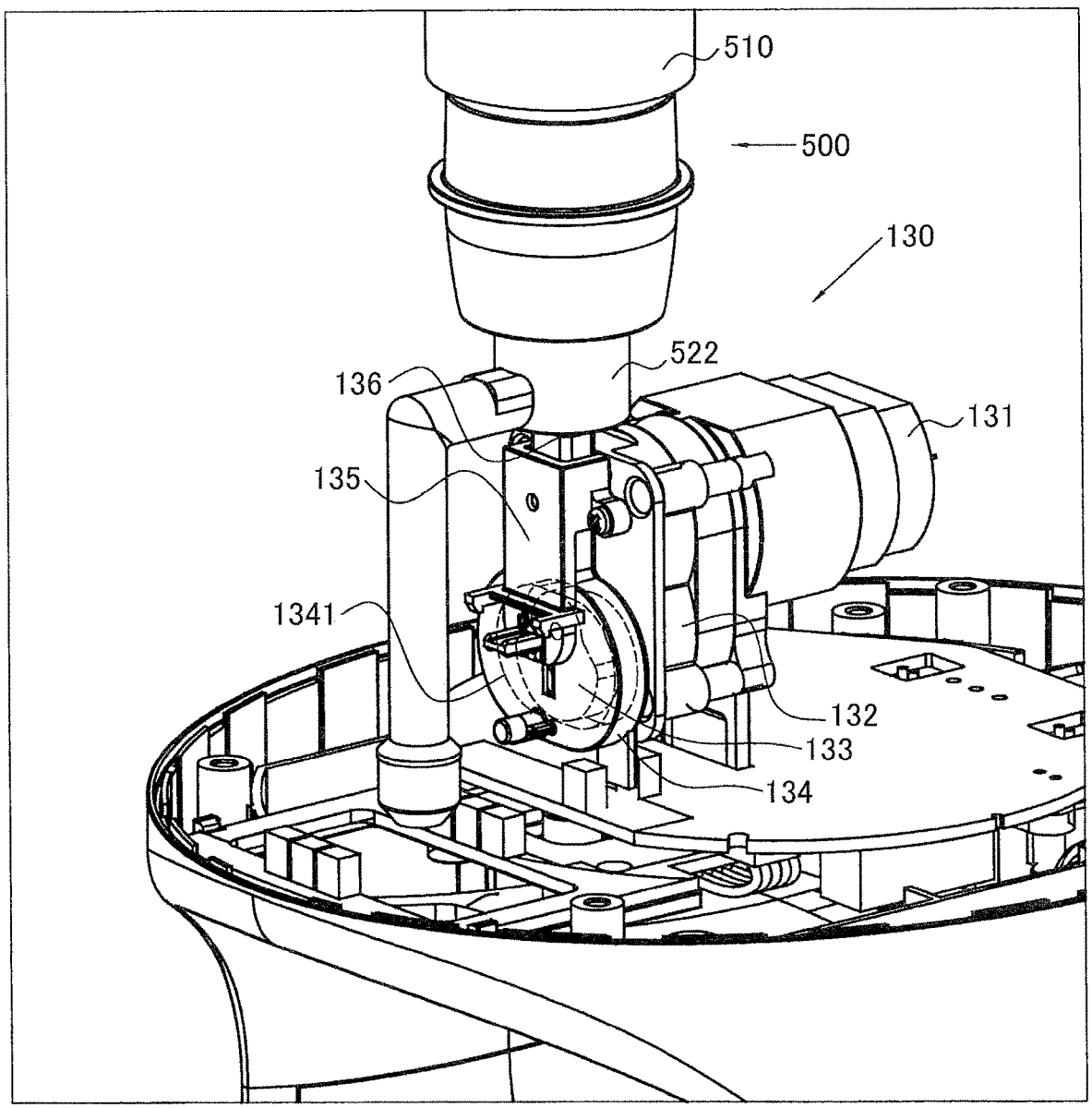
FIG. 7 is a perspective view of an example of the liquid object dispenser according to this embodiment, illustrating the details of a dispensing mechanism.

FIG. 7 is a perspective view of an example of the liquid object dispenser 100 according to this embodiment, illustrating the details of its dispensing mechanism 130.

The liquid object dispenser 100 includes the dispensing mechanism 130 at a position corresponding to the dispensing position PosA on the turntable 110. The dispensing mechanism 130 according to this embodiment includes a dispensing motor 131, a speed reducer 132, a cam 133, a slide member 134, and a fixing member 135. The rotating shaft of the dispensing motor 131 connects to the speed reducer 132. The speed reducer 132 connects to the cam 133. The speed reducer 132 decelerates the rotation of the dispensing motor 131 to turn the cam 133. The cam 133 is a substantially fan-shaped eccentric cam. The cam 133 is inserted in a recess 1341 provided in a surface of the slide member 134 facing toward the speed reducer 132. The cam 133 turns to contact the inner surface of the recess 1341 to slide the slide member 134 up and down. The fixing member 135 is a member that fixes the slide member 134 while holding the slide member 134 in such a manner as to slide the slide member 134 up and down.

The turntable 110 transfers the container 500 to the dispensing position PosA. The position of the push button 522 of the container 500 at the dispensing position PosA coincides with the position of an end portion 136 of the slide member 134 in a top view. When the slide member 134 slides toward the container 500 (upward), the end portion 136 of the slide member 134 contacts the push button 522 of the container 500 to press the push button 522 of the container 500 toward the body 510 of the container 500. The body 510 and the lid 520 of the container 500 are immovably fixed by a fixing structure that is not depicted. Accordingly, as the push button 522 of the container 500 is pressed, the stored liquid (dispensing liquid) stored in the container 500 is dispensed. The liquid object dispenser 100 controls the amount of the stored liquid (dispensing liquid) by the number of times the push button 522 is pressed.

The container 500 is an example of a liquid object dispensing part. Furthermore, the dispensing mechanism 130 is an example of a pressing part.

<Control Device 140>

Figure 8:
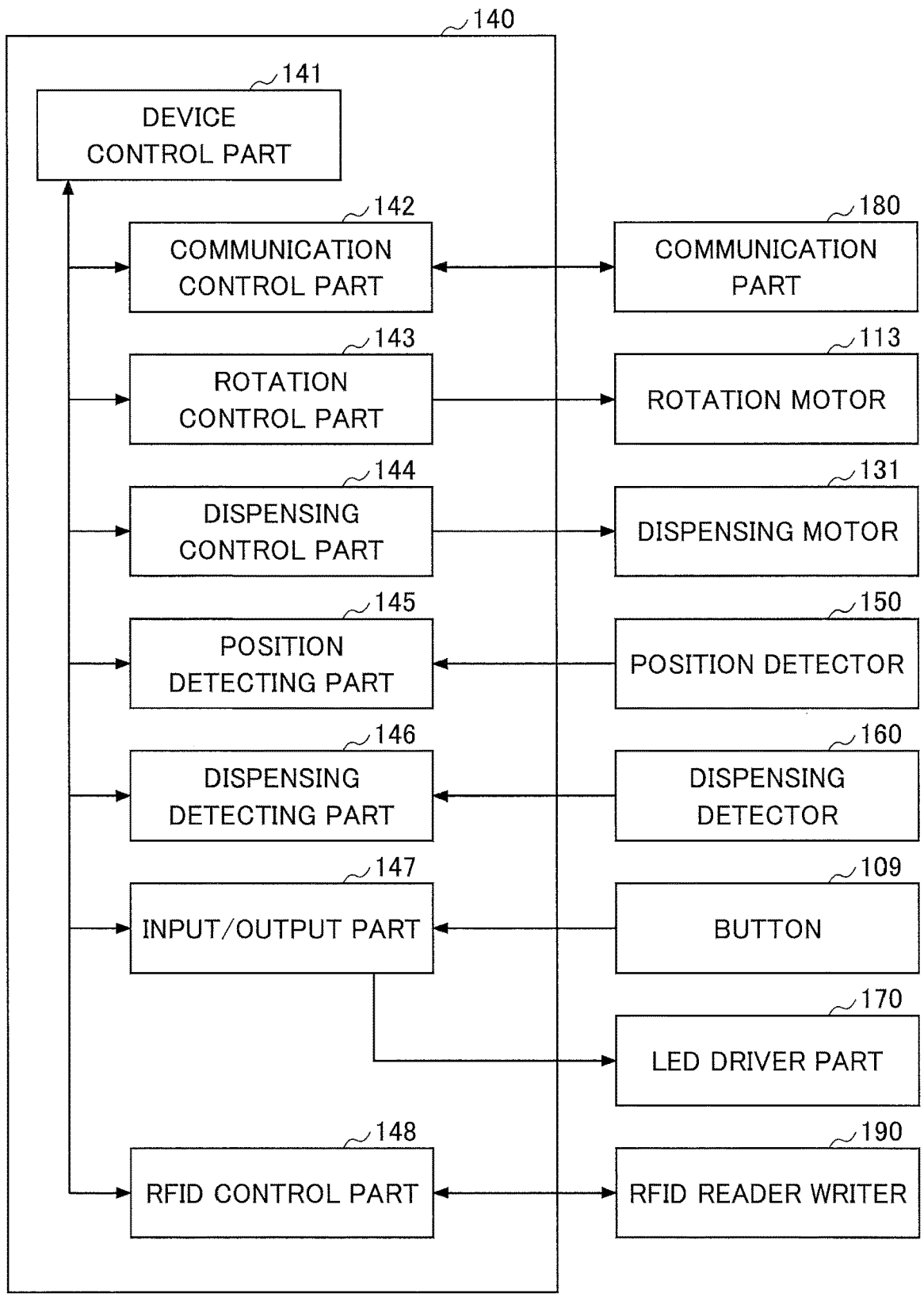
FIG. 8 is a functional block diagram of an example of the liquid object dispenser according to this embodiment.

FIG. 8 is a functional block diagram of an example of the liquid object dispenser 100 according to this embodiment.

The liquid object dispenser 100 includes the control device 140. The control device 140 controls the operation of the liquid object dispenser 100. The control device 140 includes a device control part 141, a communication control part 142, a rotation control part 143, a dispensing control part 144, a position detecting part 145, a dispensing detecting part 146, an input/output part 147, and an RFID control part 148.

The device control part 141 controls the entire device.

The communication control part 142 controls communications between the liquid object dispenser 100 and the information processing terminal 200 and the server apparatus 300. The communication control part 142 controls a communication part 180 provided in the liquid object dispenser 100. The communication part 180 performs communications with the information processing terminal 200 and the server apparatus 300 via the network 400 based on the control of the communication control part 142. The communication part 180 performs communications through, for example, short-range communications based on Bluetooth (registered trademark) or the like, wireless LAN (Local Area Network) communications, mobile communications based on LTE (Long Term Evolution) or the like, etc.

The rotation control part 143 controls the rotation of the turntable 110. The turntable 110 is connected to a rotation motor 113. The rotation control part 143 controls the rotation of the turntable 110 by controlling the rotation of the rotation motor 113.

The dispensing control part 144 controls the dispensing of the liquid object (stored liquid). The dispensing control part 144 controls the dispensing of the liquid object (stored liquid) by controlling the rotation of the dispensing motor 131 of the dispensing mechanism 130.

The position detecting part 145 detects whether a predetermined container 500 is at a predetermined position, for example, the dispensing position PosA or the replacement position PosB. The position detecting part 145 detects the position of a predetermined container 500 from the detection result of a position detector 150 provided in the liquid object dispenser 100.

The dispensing detecting part 146 detects whether the liquid object (stored liquid) has been dispensed from the container 500 at the dispensing position PosA. The dispensing detecting part 146 detects whether the liquid object (stored liquid) has been dispensed from the detection result of a dispensing detector 160 provided in the liquid object dispenser 100.

The input/output part 147 receives an input from the user and outputs information to the user. The input/output part 147 detects the depression of the button 109 to receive an input from the user. Furthermore, the input/output part 147 controls the light emission of an LED provided in the liquid object dispenser 100 by controlling an LED driver part 170 to output information to the user.

The RFID control part 148 controls the input and output of information recorded in the RFID tag 550 of the container 500. The RFID control part 148 controls an RFID reader writer 190 provided in the liquid object dispenser 100 to read information from and write information to the RFID tag 550 of the container 500.

The functions of the control device 140 are implemented by a CPU (Central Processing Unit) running programs readably stored in a storage that is not depicted. For example, these functions are implemented by the cooperation of hardware and software in a microcomputer including a CPU. The control device 140 may be distributed between or among multiple processors, or other functions may be incorporated into the control device 140.

<Operation of Liquid Object Dispenser 100>

The server apparatus 300 determines the type and amount of a liquid object dispensed from the liquid object dispenser 100 used by a user from personal information such as the age, skin characteristics, skin condition, etc., of the user, the environmental information such as temperature, humidity, and weather of the day of use, time information, etc. When the user depresses the button (switch) 109 of the liquid object dispenser 100, the liquid object dispenser 100 performs transmission to the server apparatus 300, and the server apparatus 300 transmits information on the type and amount of a liquid object to be dispensed (dispensing liquid information) to the liquid object dispenser 100. When the user inserts her/his hand into the hand insertion part 105, the liquid object dispenser 100 dispenses one or more types of liquid objects corresponding to the containers 500 housed in the liquid object dispenser 100. The liquid object dispenser 100 dispenses each liquid object based on the amount in the dispensing liquid information.

The device control part 141 of the liquid object dispenser 100 identifies the container 500 from which to dispense a liquid object among the containers 500 (501, 502, 503, 504, 505) accommodated in the liquid object dispenser 100, from the dispensing liquid information received from the server apparatus 300. The device control part 141 calculates the amount of the liquid object to dispense, namely, the number of times the push button 522 is pressed, with respect to the identified dispensing container 500.

In response to the insertion of the user's hand into the hand insertion part 105, the device control part 141 rotationally transfers the container accommodating part 120 of the container 500 from which to dispense the liquid object to the dispensing position PosA by controlling the rotation control part 143. Next, the device control part 141 controls the dispensing control part 144 to press the push button 522 of the container 500 the calculated number of times to dispense the liquid object.

<Dispensing Detector 160>

Figure 9:
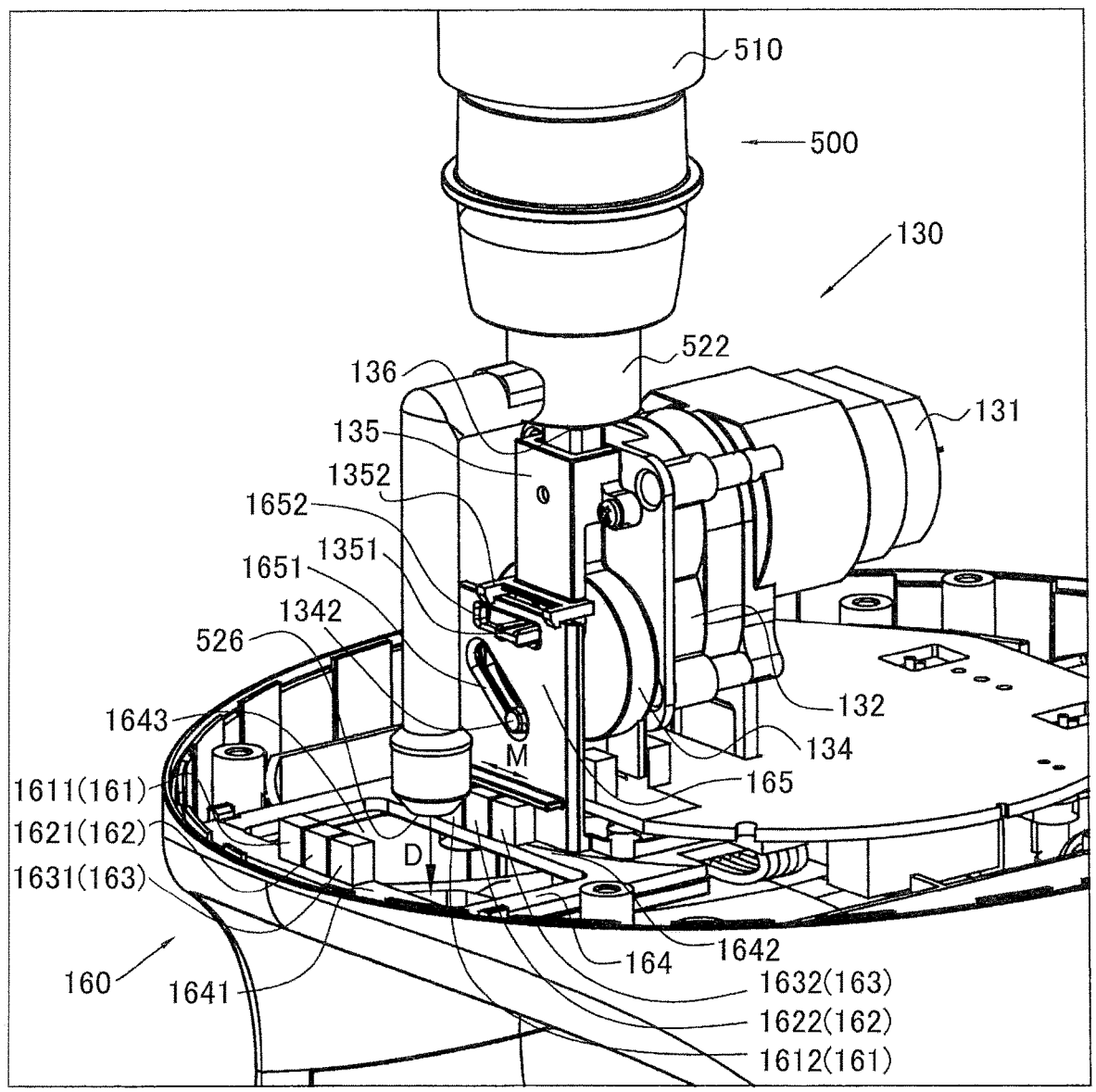
FIG. 9 is an enlarged view of the part of a dispensing detector of an example of the liquid object dispenser according to this embodiment.
Figure 10:
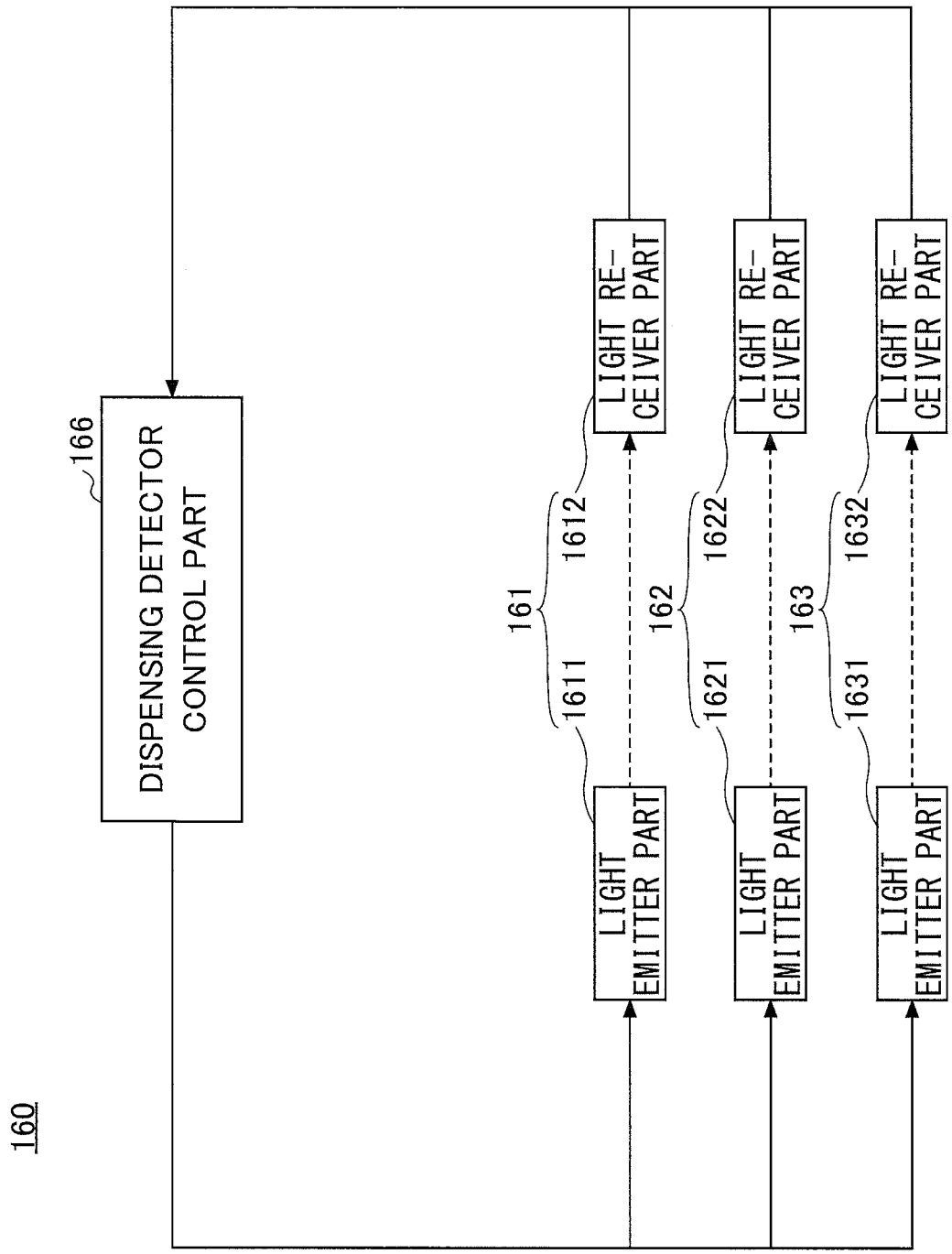
FIG. 10 is a functional block diagram of the dispensing detector of an example of the liquid object dispenser according to this embodiment.

FIG. 9 is an enlarged view of the part of the dispensing detector 160 of the liquid object dispenser 100. Furthermore, FIG. 10 is a functional block diagram of the dispensing detector of an example of the liquid object dispenser according to this embodiment.

The dispensing detector 160 is described. The dispensing detector 160 includes three sensors 161, 162 and 163, a plate 164 on which the sensors 161, 162 and 163 are placed, a cam plate 165 to move the plate 164, and a dispensing detector control part 166.

The sensors 161, 162 and 163 are described. The sensors 161, 162 and 163 of the dispensing detector 160 of this embodiment are arranged in a direction that crosses a direction in which a liquid object is dispensed from the dispensing opening 526 of the container 500 (dispensing direction).

Here, the sensor 161 is described. The sensor 161 includes a light emitter part 1611 and a light receiver part 1612. The light emitter part 1611 includes a light-emitting device. The light-emitting device is, for example, a light-emitting diode. The light emitter part 1611 outputs light emitted by the light-emitting device toward the light receiver part 1612. The light receiver part 1612 includes a light-receiving device. The light-receiving device is, for example, a photodiode. The light receiver part 1612 receives light output from the light emitter part 1611 at the light-receiving device. An area in which light propagates between the light emitter part 1611 and the light receiver part 1612 is the sensor sensing range of the sensor 161.

The light that the light emitter part 1611 outputs is light of a wavelength absorbed by or reflected from the liquid object. Accordingly, when there is the liquid object in the sensor sensing range between the light emitter part 1611 and the light receiver part 1612, the output light of the light emitter part 1611 is blocked by the liquid object, so that the amount of light received at the light receiver part 1612 is reduced. Thus, it is possible to detect whether the liquid object is dispensed in the sensor sensing range by the presence or absence of reduction in light.

The sensors 162 and 163 are sensors equal to the sensor 161. That is, the sensors 162 and 163 include respective light emitter parts 1621 and 1631 and respective light receiver parts 1622 and 1632. The sensors 162 and 163 operate the same as the sensor 161.

Next, the plate 164 on which the sensors 161, 162 and 163 are placed is described. The plate 164 includes a light emitter part placement part 1641, a light receiver part placement part 1642, and an opening 1643. The light emitter parts 1611, 1621 and 1631 of the sensors 161, 162 and 163 are placed on the light emitter part placement part 1641. The light receiver parts 1612, 1622 and 1632 of the sensors 161, 162 and 163 are placed on the light receiver part placement part 1642. The light emitter part placement part 1641 and the light receiver part placement part 1642 are placed across the opening 1643 from each other. Thus, a space above the opening 1643 of the plate 164 serves as the respective sensor sensing ranges of the sensors 161, 162 and 163. The liquid object dispensed from the dispensing opening 526 of the container 500 is dispensed from the extraction opening 106 through the opening 1643.

According to this embodiment, the light emitter parts and the light receiver parts of sensors are placed at different locations on the plate 164, as on the light emitter part placement part 1641 and the light receiver part placement part 1642. The arrangement of light emitter parts and light receiver parts, however, may be changed to the extent that the sensors are so placed as to have their sensor sensing ranges above the opening 1643. For example, the respective light emitter part, light receiver part, and light emitter part of sensors may be placed in order on one side and the corresponding light receiver part, light emitter part, and light receiver part of the sensors may be placed in order on the other side of the opening 1643.

Next, the cam plate 165 that moves the plate 164 is described.

The cam plate 165 includes a diagonally formed inclined groove 1651 and a laterally formed lateral groove 1652. A protrusion 1342 protruding from the slide member 134 of the dispensing mechanism 130 is fit into the inclined groove 1651. A protrusion 1351 protruding from the fixing member 135 of the dispensing mechanism 130 is fit into the lateral groove 1652. Furthermore, the top of the cam plate 165 is so held by a holding member 1352 protruding from the fixing member 135 of the dispensing mechanism 130 as not to move upward.

When the liquid object dispenser 100 dispenses a liquid object, the slide member 134 of the dispensing mechanism 130 slides upward. The upward slide of the slide member 134 moves the protrusion 1342 of the slide member 134 upward. The protrusion 1342 is fit into the inclined groove 1651 of the cam plate 165. Therefore, the protrusion 1342 moves upward to move along the inclined groove 1651 of the cam plate 165. The upward and downward movements of the cam plate 165 are restricted by the protrusion 1351 of the fixing member 135 fit into the lateral groove 1652 and the holding member 1352. Accordingly, when the protrusion 1342 moves upward, the protrusion 1342 moves along the inclined groove 1651 of the cam plate 165 to move the cam plate 165 in a lateral direction, namely, a direction that crosses the dispensing direction of the liquid object, so that the plate 164 moves in the lateral direction, namely, a direction that crosses the dispensing direction of the liquid object. As a result, the sensors 161, 162 and 163 provided on the plate 164 move in the lateral direction, namely, a direction that crosses the direction in which the liquid object is dispensed from the dispensing opening 526 of the container 500 (the dispensing direction), which is the same direction as a direction in which the sensors 161, 162 and 163 are arranged.

The plate 164 is an example of a retaining member that retains sensors. The cam plate 165 and the dispensing mechanism 130 is an example of a sensor moving part. Furthermore, the dispensing detector 160 is an example of a liquid object detector.

Thus, according to the dispensing detector 160 of this embodiment, the plate 164 is interlocked with the dispensing mechanism 130 that dispenses a liquid object from the container 500, specifically, the slide member 134 that presses the push button 522 of the container 500 to cause a liquid object to be dispensed.

<Operation and Effects>

According to the dispensing detector 160 of this embodiment, the dispensing detector 160 has the sensors 161, 162 and 163 that detect whether a liquid object has been dispensed arranged in a direction that crosses a direction in which the liquid object is dispensed from the dispensing opening 526 of the container 500 (dispensing direction). Because of this, for example, in the case where the sensor 162 is supposed to detect a liquid object, even when, for example, the dispensing direction shifts because of adhesion of the liquid object to the dispensing opening 526 to be off the sensor sensing range of the sensor 162, it is possible to detect the liquid object with the sensor 161 or 163. Accordingly, by having multiple sensors provided in a direction that crosses the dispensing direction of a liquid object as the sensors 161, 162 and 163, it is possible to stably detect the liquid object.

Furthermore, the plate 164 of the dispensing detector 160 of this embodiment moves in directions that cross a direction in which the liquid object is dispensed from the dispensing opening 526 of the container 500 (dispensing direction) and are the same as directions in which the sensors 161, 162 and 163 are arranged (the directions of arrow M in FIG. 9).

By moving the sensors 161, 162 and 163 by moving the plate 164, it is possible to detect the liquid object even when the dispensing direction of the liquid object shifts to be between the sensors 161 and 162 or the sensors 162 and 163. Accordingly, by moving the sensors 161, 162 and 163, it is possible to detect the liquid object with more stability.

According to the liquid object dispenser 100 of this embodiment, the dispensing mechanism 130 that presses the container 500 that constitutes a push pump and the cam plate 165 that moves the plate 164 are interlocked, thereby making it possible to move the sensors to the dispensing of a liquid object. This makes it possible to stably detect the liquid object.

Furthermore, by coordinating the liquid object and the movement of the sensors, it is possible to move the sensors to the dispensing of the liquid object, so that it is possible to stably detect the liquid object.

According to the liquid object dispensing system 1 of this embodiment, the server apparatus 300 manages the state of the liquid object dispenser 100. For example, the server apparatus 300 manages the remaining amount of a liquid object stored in the container 500 of the liquid object dispenser 100. Use of the dispensing detector 160 of this embodiment makes it possible to accurately manage the remaining amount by detecting the dispensing of the liquid object.

The present invention is described above based on an embodiment. The present invention, however, is not limited to the above-described embodiment, and various variations may be made without departing from the scope of the claims.

For example, the number of sensors of the dispensing detector 160 is not limited to three. The number of sensors of the dispensing detector 160 may be two or four or more.

DESCRIPTION OF THE REFERENCE NUMERALS

100 liquid object dispenser
130 dispensing mechanism
160 dispensing detector
161 sensor
162 sensor
163 sensor
164 plate
165 cam plate
500 container
510 body
520 lid

The invention claimed is:

1. A liquid object detector comprising:
a liquid object dispensing part;
a plurality of sensors each including a light emitter and a light receiver and each configured to detect a liquid object dispensed by the liquid object dispensing part by the light emitter outputting light toward the light receiver, the plurality of sensors being arranged in a first direction crossing a second direction in which the liquid object is dispensed; and
a sensor moving part configured to move the plurality of sensors in the first direction.

2. The liquid object detector as claimed in claim 1, wherein
the sensor moving part includes
a retaining member retaining the plurality of sensors; and
a drive part configured to move the retaining member.

3. The liquid object detector as claimed in claim 2, wherein
the liquid object dispensing part includes
a storage part configured to store the liquid object to dispense; and
a push pump configured to dispense the liquid object, and the drive part is interlocked with a pressing part configured to press the push pump to cause the liquid object to be dispensed.

4. A liquid object detecting method comprising:

dispensing a liquid object by a liquid object dispensing part; and moving a plurality of sensors in a first direction crossing a second direction in which the liquid object is dispensed, the plurality of sensors being arranged in the first direction, the plurality of sensors each including a light emitter and a light receiver and each being configured to detect the liquid object dispensed by the liquid object dispensing part by the light emitter outputting light toward the light receiver, wherein said dispensing and said moving are coordinated.

* * * * *